United States Patent
Turk et al.

[11] Patent Number: 5,914,288
[45] Date of Patent: Jun. 22, 1999

[54] METAL SULFIDE INITIATORS FOR METAL OXIDE SORBENT REGENERATION

[75] Inventors: Brian S. Turk; Raghubir P. Gupta, both of Durham, N.C.

[73] Assignee: Research Triangle Institute, Research Triangle Park, N.C.

[21] Appl. No.: 08/939,577

[22] Filed: Sep. 29, 1997

[51] Int. Cl.⁶ .............................. B01J 20/34; B01J 38/02; B01J 38/12

[52] U.S. Cl. ................................. 502/38; 502/39; 502/41; 502/44; 502/56

[58] Field of Search ................................. 502/38, 39, 41, 502/44, 56; 423/542, 53, 47

[56] References Cited

U.S. PATENT DOCUMENTS

| | | | |
|---|---|---|---|
| 2,515,131 | 7/1950 | Mack | 196/28 |
| 4,083,924 | 4/1978 | Styring | 423/88 |
| 4,088,736 | 5/1978 | Courty et al. | 423/230 |
| 4,208,303 | 6/1980 | Sasaki et al. | 252/417 |
| 4,313,820 | 2/1982 | Farha et al. | 208/213 |
| 4,409,124 | 10/1983 | Robinson et al. | 502/5 |
| 4,618,593 | 10/1986 | Sasaki et al. | 502/20 |
| 4,725,415 | 2/1988 | Kidd | 423/230 |
| 4,757,038 | 7/1988 | Sasaki et al. | 502/20 |
| 4,769,045 | 9/1988 | Grindley | 48/202 |
| 4,849,202 | 7/1989 | Lee | 423/574 |
| 4,865,826 | 9/1989 | Carnell et al. | 502/34 |
| 4,946,658 | 8/1990 | Marten et al. | 423/168 |
| 4,975,399 | 12/1990 | Gardner | 502/38 |
| 4,977,123 | 12/1990 | Flytzani-Stephanopoulos et al. | 502/84 |
| 4,983,365 | 1/1991 | Denny et al. | 423/230 |
| 5,254,516 | 10/1993 | Gupta et al. | 502/84 |
| 5,401,475 | 3/1995 | Ayala et al. | 422/190 |
| 5,427,752 | 6/1995 | Suehiro et al. | 423/231 |
| 5,439,867 | 8/1995 | Khare et al. | 502/407 |
| 5,527,750 | 6/1996 | Haun et al. | 502/20 |

*Primary Examiner*—Michael Lewis
*Assistant Examiner*—Alexander G. Ghyka
*Attorney, Agent, or Firm*—Alston & Bird LLP

[57] ABSTRACT

A process of regenerating a sulfided sorbent is provided. According to the process of the invention, a substantial portion of the energy necessary to initiate the regeneration reaction is provided by the combustion of a particulate metal sulfide additive. In using the particulate metal sulfide additive, the oxygen-containing gas used to regenerate the sulfided sorbent can be fed to the regeneration zone without heating or at a lower temperature than used in conventional processes wherein the regeneration reaction is initiated only by heating the oxygen-containing. The particulate metal sulfide additive is preferably an inexpensive mineral ore such as iron pyrite which does not adversely affect the regeneration or corresponding desulfurization reactions. The invention further includes a sorbent composition comprising the particulate metal sulfide additive in admixture with an active metal oxide sorbent capable of removing one or more sulfur compounds from a sulfur-containing gas stream.

18 Claims, 1 Drawing Sheet

METAL SULFIDE INITIATORS FOR METAL OXIDE SORBENT REGENERATION

This invention was made with support from the United States Government under Contract No. DE-AC21-88MC25006 awarded by the United States Department of Energy. The U.S. Government may have certain rights to this invention.

FIELD OF THE INVENTION

The present invention relates to the desulfurization of a gas stream using active metal oxide sorbents, and particularly to active metal oxide sorbents having enhanced regeneration properties and to enhanced methods of regenerating active metal oxide sorbents.

BACKGROUND OF THE INVENTION

The removal of sulfur compounds from sulfur-containing gas streams is an important environmental process. For this reason, various emission requirements limit the amount of sulfur compounds which can be emitted into the atmosphere since sulfur compounds in gaseous emissions can result in the pollution of the atmosphere which can produce undesirable results such as acid rain and the like. Furthermore, in many cases when a gas stream containing sulfur contaminants is processed, the sulfur compounds can poison sulfur sensitive catalysts, corrode equipment, or have other adverse effects.

One technique for the desulfurization of sulfur-containing gas streams involves heating the gas stream with particulate materials that absorb objectional sulfur compounds. These sulfur absorbing materials or "sorbents" are typically high surface area, highly porous materials capable of removing sufficient quantities of sulfur compounds so that the treated gas streams exhibit very low sulfur content and thus can meet emission requirements for sulfur compounds. One conventional class of sorbents for absorbing sulfur compounds are active metal oxide sorbents which include supported and unsupported active metal oxides derived from the calcination of various individual and mixed active metal oxides.

For example, U.S. Pat. No. 4,088,736 to Courty et al. proposes a zinc oxide sorbent which is supported on silica and/or alumina. Other sorbents for removing sulfur compounds that are derived from the calcination of active metal oxides include the sorbents described in U.S. Pat. No. 4,769,045 to Grindley which proposes a zinc ferrite sorbent prepared from the mixing and calcining equimolar amounts of zinc oxide and iron oxide. U.S. Pat. Nos. 4,313,820 and 4,725,415, both assigned to Phillips Petroleum Company, propose the use of zinc titanate sorbents formed from the mixing and calcination of zinc oxide and titanium dioxide. U.S. Pat. No. 5,254,516 to Gupta et al. also discloses zinc titanate sorbents. Additionally, U.S. Pat. No. 4,977,123 to Flytzani-Stephanopolous et al., proposes a method of making mixed active metal oxide sorbents prepared using calcined powders of oxides of various metals such as for example, copper, iron, aluminum, zinc, titanium, and mixtures thereof to form the sorbent material.

One desirable application for active metal oxide sorbents is the removal of sulfur compounds from fuel gas streams. Specifically, active metal oxide sorbents are particularly desirable for use in the desulfurization of coal gas streams that are used as fuel for power generation systems. These systems convert chemical energy stored in coal to electricity by first generating fuel gas via coal gasification, and then oxidizing the hot gas in either a turbine or a fuel cell. This approach, however, is complicated by the presence of sulfur in coal, which is converted to reduced sulfur species such as $H_2S$, COS, and $CS_2$ during gasification. Subsequently, during combustion of the fuel gas, the $H_2S$ oxidizes to $SO_2$ which can cause the formation of acid rain if discharged into the atmosphere. In addition to environmental concerns, high concentrations of $H_2S$ can be corrosive to energy producing equipment and can adversely affect the performance of molten carbonate fuel cells due to sulfur poisoning of electrodes.

In the conventional method of removing sulfur compounds such as $H_2S$, COS and $CS_2$ from coal gas streams, a hot gas stream is fed from the gasifier to an absorber at a temperature of between about 800° F. and 1000° F. The absorber is typically a fixed-bed, fluidized bed, or moving bed reactor containing a particulate supported or unsupported active metal oxide sorbent. The particles containing the active metal oxide sorbent are intimately contacted with the hot gas stream entering the reactor resulting in absorption of the sulfur compounds by the active metal oxide sorbents, i.e., reaction of the active metal oxide and sulfur compound to form a metal sulfide (a sulfided sorbent) and typically either water or carbon dioxide.

In the conventional desulfurization process, the metal sulfides derived from the active metal oxide sorbents are recovered from the desulfurization process and transported to an adiabatic bed reactor for regeneration. In the regenerator, the fluidizable particles containing the sulfided sorbents are regenerated in an oxygen-containing gas stream such as an oxygen-enriched, a diluted, or an undiluted atmospheric air stream. The sulfided sorbent reacts exothermically with oxygen and is regenerated to the active metal oxide based sorbent and forms sulfur dioxide as a by-product.

In the regenerator, the temperature necessary to effectively initiate the regeneration reaction is typically in excess of about 1000° F. Although part of the heat necessary to initiate the reaction is supplied by the sulfided sorbent which, as described above, is heated to a typical temperature of between about 800° F. and 1000° F. during the desulfurization process, the heat carried by the sorbent is generally below the temperature necessary for start up of the regeneration process. For example, conventional zinc oxide and zinc titanate sorbents typically require a regeneration temperature in the range of between about 1150° F. and 1400° F. Although various modifications have been proposed to provide sorbents having somewhat lower initiation temperatures for regeneration thereof, such modifications can lead to various other complications. Thus, for example, U.S. Pat. No. 5,439,867 to Khare et al., and assigned to Phillips Petroleum, describes a zinc oxide based sorbent containing a nickel oxide or nickel nitrate promoter wherein the sorbent is regenerated at temperatures of about 1100° F. and 1200° F. However, the nickel promoter tends to increase disposal problems associated with the spent sorbent, and during use of the sorbent for sulfur removal from fuel gas streams, also tends to catalyze the formation of methane from carbon monoxide and hydrogen, which depletes the energy in the desulfurized fuel gas.

In any case, because the regeneration reactor is adiabatic, start up of the regeneration reaction is traditionally initiated by raising the temperature of the oxygen-containing gas fed to the regenerator to a temperature above the initiation temperature of the regeneration reaction. However, heating of the oxygen-containing gas stream requires increased capital investment in various heating and associated apparatus, and is also energy intensive and thus substantially increases the costs associated with sulfur removal from fuel gas streams. Moreover, in some cases, such as transport reactor-based processes, residence time of the sorbent in the regenerator may not be sufficient to provide the temperature rise needed to achieve regeneration of sulfided sorbent.

SUMMARY OF THE INVENTION

The present invention provides sorbent compositions having enhanced regeneration properties, and methods for the enhanced regeneration of sulfided sorbents. The compositions and methods of the invention can minimize or eliminate the need to rely on external energy for initiating regeneration of a sulfided sorbent. This in turn, can significantly reduce capital costs and process complexities associated with reliance on such external energy for initiation of sorbent regeneration.

The sorbent compositions of the invention comprise an active metal oxide sorbent in admixture with a particulate metal sulfide additive that reacts exothermically with oxygen at a temperature below the temperature normally necessary for regenerating the sulfided sorbent with oxygen. The particulate metal sulfide additive exothermically reacts with oxygen during the sorbent regeneration process to provide all or a portion of the activation energy necessary for initiation of sorbent regeneration. In turn, the oxygen-containing gas used for sorbent regeneration requires no added heat, or less heating than in conventional processes in which the regeneration reaction is initiated only by the costly process of increasing the temperature of the oxygen-containing gas stream. The particulate metal sulfide additive is preferably an inexpensive mineral ore such as iron pyrite which does not adversely affect the regeneration reaction or the corresponding desulfurization reaction.

The particulate metal sulfide component is present in the sorbent compositions of the invention in an amount less than the active metal oxide sorbent component and typically constitutes less than about 20 wt % of the sorbent composition, preferably less than about 10 wt % of the sorbent composition. The active metal oxide sorbent component is selected from various known compositions and can be present in any of various known forms well known to the skilled artisan, including both supported and unsupported forms. Similarly, the particulate metal sulfide component can be supported or unsupported. Thus, the active metal oxide sorbent and particulate metal sulfide additive can be provided as an admixture supported on the same support material, or alternatively, the active metal oxide sorbent be provided on a first particulate support and the particulate metal sulfide additive provided on a second particulate support. In a preferred embodiment, the particulate metal sulfide material is provided in the form of unsupported particles, advantageously of fluidizable size and weight, which are simply mixed with the active metal oxide sorbent, which in turn, can be present in supported or unsupported form.

In use, the sorbent composition of the invention is contacted with a sulfur containing gas stream in a desulfurization zone, which converts the active metal oxide sorbent to a sulfided sorbent but causes little, if any, significant change in the particulate metal sulfide additive because the particulate metal sulfide additive is substantially inert with respect to the desulfurization process. The sulfided sorbent, together with the particulate metal sulfide additive, is recovered from the desulfurization zone and the mixture is passed to a regeneration zone for treatment with an oxygen-containing gas. In accord with the invention, the quantity of external heat, if any, provided to the regeneration zone at start-up is insufficient to heat the sulfided active metal oxide sorbent to the temperature necessary to regenerate the sorbent. However, the exothermic reaction of the oxygen-containing gas with the particulate metal sulfide additive releases sufficient heat to raise the temperature of the sulfided active metal oxide sorbent to the initiation temperature necessary for regeneration. Advantageously the heat released by reaction of the particulate metal sulfide additive is sufficient to raise the temperature of the regeneration zone by at least 50° F.

The particulate metal sulfide additive provides useful energy for initiation of the regeneration reaction without substantial negative impact on the regeneration process, or on the desulfurization process. Thus, no special equipment or process modifications are required in the regeneration zone to process the active metal oxide and sulfur dioxide gas by-products resulting from the reaction of the particulate metal sulfide additive with oxygen because conventional regeneration processes are already designed to process sulfur dioxide produced in the regeneration of sulfided sorbent. Furthermore, the particulate metal sulfide additives do not react detrimentally, if at all, with $H_2S$ or other sulfur components during the desulfurization process. The oxidized particulate metal sulfide additive, i.e., particulate metal oxide, formed in the regenerator can be recycled to the desulfurization process or, as in the case of preferred particulate metal sulfide additives such as iron pyrite ($FeS_2$), can form a an attrition-prone ash-like material, that passes out of the regenerator with the sulfur dioxide-containing, regenerator off-gas.

In accordance with another aspect of the invention, the particulate metal sulfide additive can be added to a sulfided, active metal oxide sorbent prior to, or during, regeneration of the sorbent, particularly at start-up of the regeneration process. As in the above process, the sulfided sorbent and the particulate metal sulfide additive are treated with an oxygen-containing gas in the regeneration zone with or without the addition of external heat. Reaction of the particulate metal sulfide additive with oxygen increases the temperature of the regeneration zone to the initiation temperature for the reaction of sulfided sorbent with oxygen, thus reducing or eliminating the need for heating the oxygen-containing gas fed to the regenerator.

BRIEF DESCRIPTION OF THE DRAWINGS

In the drawings which form a portion of the original disclosure of this application.

DETAILED DESCRIPTION OF THE PREFERRED EMBODIMENTS

Figure 1:
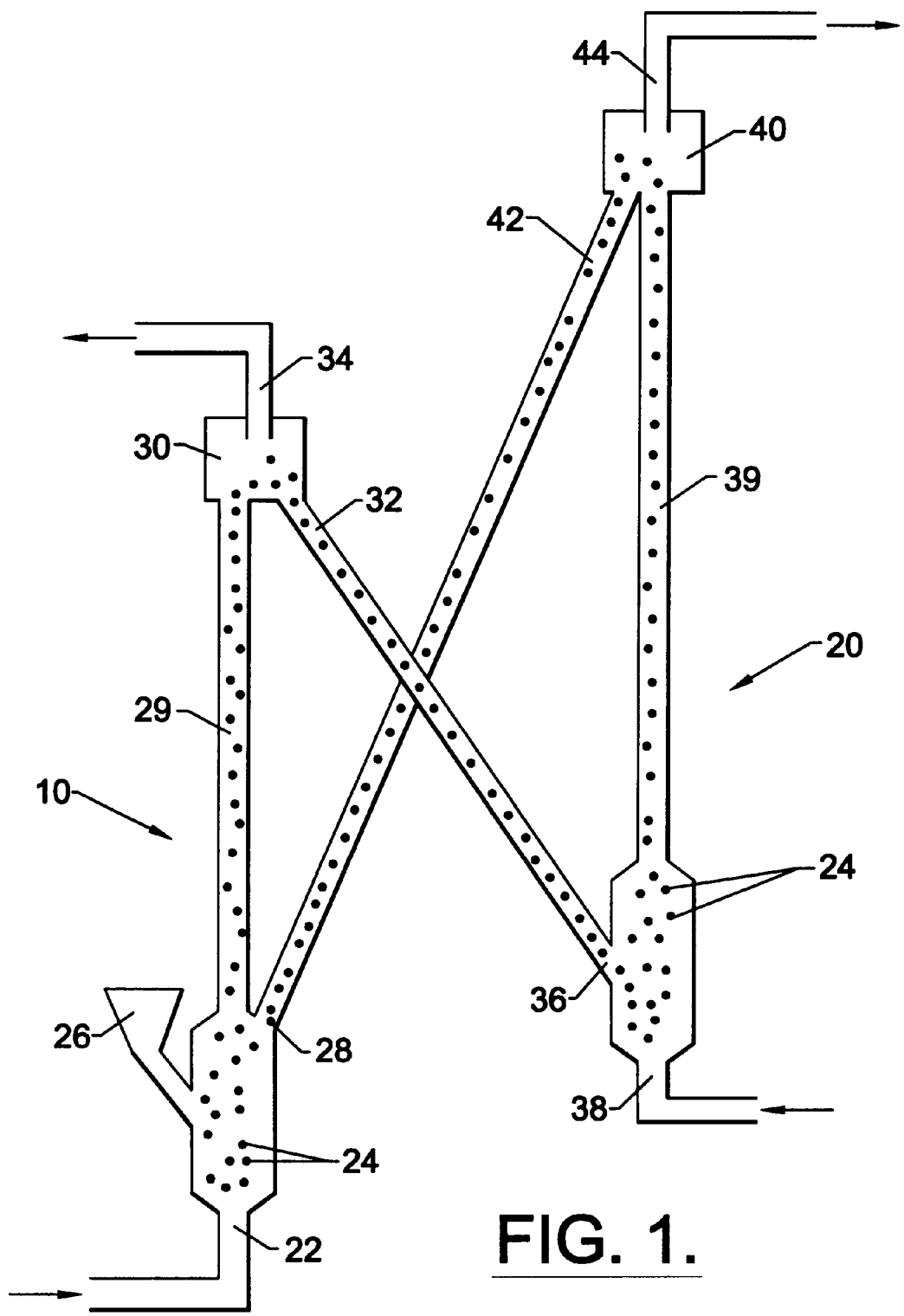
FIG. 1 is a schematic view of one preferred continuous desulfurization and regeneration process according to the invention.

In the drawings and the following detailed description, preferred methods and sorbent compositions of the invention are described in detail. Although the invention is described with reference to these specific preferred embodiments, it will be understood that the invention is not limited to these preferred embodiments. But to the contrary, the invention includes numerous alternatives, modifications and equivalents as will become apparent from the consideration of the foregoing discussion and the following detailed description.

FIG. 1 illustrates a schematic view of a continuous desulfurization and regeneration process according to the invention. As shown in FIG. 1, the process includes a desulfurization zone 10 and a regeneration zone 20. In the preferred process of the invention illustrated in the drawing, both the desulfurization zone 10 and the regeneration zone 20 are defined by fluidized bed reactors (including bubbling bed, circulating bed, riser bed reactors, transport reactors and the like). It will be apparent to the skilled artisan, however, that sorbents and processes of the invention are equally applicable to other processes involving different types of reactors, including moving bed reactors and the like, as are described, for example, in Campbell, William M. and Henningsen, Gunnar B., *Hot Gas Desulfurization Using Transport Reactors*, publication from the M. W. Kellogg Co., pp. 1059–64, 12th Annual International Pittsburgh Coal Conf. Proc.; September 1995 which is incorporated in its entirety herein by reference.

As illustrated in FIG. 1, a sulfur-containing gas stream from an inlet 22 is fed at a predetermined velocity into the desulfurization zone 10 containing fluidizable particles 24 fed from an inlet hopper 26 or recovered from the regeneration zone 20, through a regeneration inlet 28. The term "fluidizable" as it is used herein refers to the ability of the particulate material to become hydrodynamically fluidized in a high velocity gas stream (e.g. between about 5 and about 60 ft/s, preferably between about 10 and about 30 ft/s). Numerous factors contribute to the hydrodynamic properties of the particulate material including the morphology, size, shape, density, surface area and porosity of the particulate material as is well known in the art. Typically, the desulfurization zone 10 further includes a riser tube 29 which provides further contact between the fluidizable particles 24 and the sulfur-containing gas stream.

The sulfur-containing gas stream treated in the desulfurization zone 10 contains at least one sulfur compound such as hydrogen sulfide, sulfur gas, sulfur dioxide, carbonyl sulfide (COS), carbon disulfide ($CS_2$), or the like. Exemplary sulfur-containing gas streams include coal gas streams which generally contain hydrogen sulfide, carbonyl sulfide and carbon disulfide. The sulfur-containing coal gas stream typically enters the desulfurization zone 10 after leaving a gasifier at a velocity of between about 5 and about 60 ft/sec, preferably between about 10 and about 30 ft/sec and at a temperature between about 600° F. and about 1200° F., typically between about 800° F. and about 1100° F., but can exit the gasifier at lower or higher velocities and temperatures.

As stated above, the fluidizable particles 24 become fluidized in the sulfur-containing stream. The fluidizable particles 24, comprising the sorbent composition of the invention, include an active metal oxide sorbent component, and a particulate metal sulfide additive component in admixture with the active metal oxide sorbent component. The particulate metal sulfide additive is normally present in the admixture in an amount less than the active metal oxide sorbent. Typically, the initial amount of particulate metal sulfide additive is less than about 20 percent by weight, and preferably is less than about 10 percent by weight, based on the total weight of the fluidizable particles 24. The exact amount of the particulate metal sulfide additive component will generally depend on the nature of the active metal oxide sorbent, the temperature increase desired in the regeneration zone 20, and the percentage of oxygen in the oxygen-containing gas stream entering the regeneration zone.

The active metal oxide sorbent component comprises at least one active metal oxide capable of removing one or more sulfur compound from the sulfur-containing gas stream. The term "active metal oxide sorbent" as used herein refers not only to active metal oxides but also to mixed active metal oxides, including different oxides of the same elements, for example, zinc titanate which includes various oxides of the formula $ZnO \cdot n(TiO_2)$ and to mixed oxides of different metals, including active metal oxides derived from the calcining of active metal oxides, and also to carbonates. Such active metal oxide sorbents can include binders that are mixed or reacted with the active metal oxide, supports that support the active metal oxide, and the like, as will be well known to the skilled artisan. Active metal oxide sorbents exhibiting good absorption rates and capacity for sulfur compounds, good regenerability without appreciable loss of efficacy or efficiency, and high attrition resistance are preferred for use in the invention.

Suitable active metal oxide sorbents include sorbents based on zinc oxide, zinc titanate, zinc aluminate, zinc silicate, zinc ferrite, iron oxide, nickel oxide, manganese oxide, cerium oxide, copper oxide, copper cerium oxide, copper titanate, vanadium oxide, cobalt oxide, tungsten oxide, calcium oxide, calcium carbonate, magnesium oxide, magnesium carbonate, and mixtures thereof. The sorbent composition forming the fluidizable particles 24 can further include promoters or stabilizers if desired. Exemplary promoters and stabilizers include compounds containing cobalt, nickel, molybdenum, tungsten, platinum, ruthenium, zirconium, cerium, copper, and vanadium.

Preferred active metal oxide sorbents include zinc oxide-based sorbents (including zinc titanate sorbents) which can include binders, supports, promoters, stabilizers and small amounts (e.g., less than about 10%) of other active metal oxides. Preferred zinc titanate sorbents typically contain both ZnO and $TiO_2$ in a suitable molar ratio typically ranging between 0.5 and 2.0. Other preferred active metal oxide sorbents include supported zinc oxide sorbents.

Exemplary active metal oxide sorbents are disclosed in U.S. Pat. No. 5,254,516, issued Oct. 19, 1993 to Gupta et al, which discloses zinc titanate sorbents having a particle size range of between 50 and 400 microns prepared by granulating a mixture of fine zinc oxide and titanium dioxide with an inorganic binder such as bentonite and/or kaolinite, and an organic binder, and then indurating the granules. The resultant sorbent particles are highly attrition resistant and are capable of absorbing significant quantities of sulfur compounds from a feed stream and are suitable for use in fixed bed, transport bed and fluidized bed reactors. Other exemplary active metal oxide sorbents are disclosed in U.S. patent application Ser. No. 08/325,853 filed Oct. 19, 1994, which is directed to highly uniform and attrition resistant zinc titanate particulate sorbent materials of high reactivity prepared by spray drying. Still other exemplary active metal oxide based sorbents are disclosed in U.S. patent application Ser. No. 08/711,877, filed Sep. 12, 1996, which discloses spherical fluidizable active metal oxide sorbents having attrition resistance and an increased particle size formed by spray drying a mixture of inorganic binder materials, an organic binder and an active metal oxide such as zinc oxide. Still other exemplary active metal oxide sorbents include Z-SORB III which is sold by Phillips Petroleum and contains a zinc oxide sorbent with a nickel promoter.

The particulate metal sulfide additive included in the fluidizable particles 24 can be in various forms including an essentially pure metal sulfide form, but is preferably in the form of a mineral ore. Suitable mineral ores include iron pyrite ($FeS_2$), alabandite (MnS), bornite ($Cu_5FeS_4$), braggite (PtS), chalcopyrite ($CuFeS_2$), covellite (CuS), chalcocite ($Cu_2S$), marcasite ($FeS_2$), millerite (NiS), molybdenite ($MoS_2$), oldhamite (CoS), pyrrhotites (FeS), wurtzite/ sphalerite (ZnS), digenite ($Cu_9S_5$), cubanite ($CuFe_2S_3$), argentite/acanthite ($Ag_2S$), and pentlandite [($Fe,Ni)_9S_8$]] and mixtures thereof. Other sulfides such as arsenic, mercury, beryllium, bismuth, lead, antimony and cadmium sulfides, and their naturally-occurring mineral ores are also capable of functioning according to the invention but are less preferred because of their toxicity and corresponding disposal problems.

Preferably the particulate metal sulfide additive is present in the form of iron pyrite mineral ore, also known as pyrite or "fool's gold", which generally includes on a weight basis 51.5% sulfur and 45.5% iron with the remaining 3.0% being silica, copper, lead and other trace metals. As is well known in the art, iron pyrite is a readily available, inexpensive mineral ore (approximately $200/ton) and is primarily used in the production of sulfuric acid and in foundry, steel, abrasive, glass and battery applications.

The particulate metal sulfide additives, promoters and stabilizers selected for use in the present invention preferably do not react adversely with, or catalyze undesirable reactions in, the sulfur-containing gas stream or the components thereof, to any significant extent. Furthermore, the particulate metal sulfide additives, promoters and stabilizers used with the invention are preferably non-hazardous and readily disposable. Therefore, nickel and nickel compounds are less preferred for use in the invention, especially with fuel streams, as they produce disposal problems and tend to catalyze the formation of methane from carbon monoxide and hydrogen in the sulfur-containing fuel streams. The formation of methane can significantly increase the temperature of the sulfur-containing fuel stream thus reducing the energy capacity of the fuel stream. Furthermore, eliminating the methane exotherm requires either a complicated and expensive temperature control system, initiation of regeneration at temperatures at which undesirable competing reactions occur, or presulfiding the sorbent as part of sorbent preparation. Because these solutions are not practical based on the current cost projections for successful commercialization of hot-gas desulfurization, the use of nickel compounds as promoters in fuel gas streams is less preferred.

Returning now to FIG. 1, in the desulfurization zone 10, the active metal oxide sorbent reacts with the sulfur compounds from the sulfur-containing gas stream to form a metal sulfide (sulfided sorbent) and water or carbon dioxide thus removing the sulfur compounds from the gas stream. The desulfurization (absorption) reaction is typically initiated at a temperature above about 600° F. and preferably less than 1200° F., more preferably, a temperature between about 800° and about 1100° F. The desulfurized gas stream and the fluidizable particles 24 carried by the desulfurized gas stream flow from the riser tube 29 into a solid-gas separator 30 such as a cyclone separator. From the solid-gas separator 30, the fluidizable particles 24 are recovered and transported to the regeneration zone 20 via suitable means such as pipe 32 and the desulfurized gas stream exits through outlet 34.

The fluidizable particles 24 including sulfided sorbent and the particulate metal sulfide additive are transported to the regeneration zone 20 and enter via inlet 36. An oxygen-containing gas stream from an inlet 38 is fed into the regeneration zone 20 at a velocity between about 5 and about 60 ft/sec, preferably between about 10 and about 30 ft/sec and fluidizes the fluidizable particles 24 to thereby facilitate contact between the fluidizable particles and the oxygen-containing gas stream. The oxygen-containing gas stream used in the regeneration zone can be, for example, a diluted, neat, or oxygen-enriched air stream (e.g., greater than 21% oxygen).

The heat carried by the heated sorbent particles, the particulate metal sulfide additive, and the heat added to the oxygen-containing stream, if any, are sufficient to establish conditions in the regeneration zone 20 for initiating reaction of the metal sulfide additive with oxygen in a highly exothermic combustion reaction to form a metal oxide and sulfur dioxide (typically a temperature at or above 800° F.). In turn, the heat released by this reaction increases the temperature in the regenerator to a temperature sufficient to initiate the desired self-sustaining combustion/regeneration reaction of the sulfided sorbent.

Those skilled in the art will understand that regeneration of the sulfided sorbent can be complete or incomplete, i.e., substantially complete conversion of the sulfided sorbent to the active metal oxide state, or conversion of only a portion of the sulfided sorbent to the active metal oxide state. In many cases it is desirable to achieve complete regeneration of the sulfided sorbent. However in other cases, it is desirable to remove only a portion of the sulfur from the sulfided sorbent, so that a portion of the sorbent is recirculated in a partially sulfided state. The degree of regeneration can be controlled by controlling the temperature conditions, oxygen content, and sorbent residence time in the regenerator as is known in the art.

Accordingly, the particulate metal sulfide additive used in the present invention can be used to promote complete regeneration of the sulfided sorbent when the temperature conditions in the regenerator would not otherwise support the self-sustaining regeneration of the sulfided sorbent. Alternatively the particulate metal sulfide additive can be used to increase the extent of sorbent regeneration in the regenerator to the desired extent of regeneration, while minimizing the use of external energy sources for heating of the regeneration gas stream. Accordingly, the term, "conditions sufficient to initiate regeneration", and variations thereof, is used herein to include conditions sufficient to initiate complete regeneration, or sufficient to increase the extent of regeneration of the sulfided sorbent to a desired amount.

Because the regeneration zone 20 is adiabatic, the temperature of the regeneration zone will stabilize at steady state conditions as a result of the combustion of the particulate metal sulfide additive and the exothermic reaction of the sulfided sorbent with oxygen. Typically, the temperature of the regeneration zone 20 can increase between start-up and steady state conditions, from an initial temperature of between about 650° F. and 1050° F. to a temperature of between about 1100° F. and 1500° F. as the regeneration zone reaches steady-state.

Preferably, a sufficient amount of the particulate metal sulfide additive is present in the regeneration zone 20 to raise the temperature of the regeneration zone by at least 50° F., and typically the quantity of particulate metal sulfide additive is sufficient to raise the temperature of the regeneration zone by greater than about 100° F. Temperature increases of 500° F. or more can be achieved by the particulate metal sulfide additives used in the present invention.

As stated above, the particulate metal sulfide additive reacts with oxygen to form a metal oxide and sulfur dioxide at temperatures generally below the temperatures which initiate the regeneration of the sulfided sorbent. Because conventional regeneration processes are already designed to process sulfur dioxide produced in the regeneration of sulfided sorbent, no special equipment or procedures are needed in the regeneration zone 20 to process the gas by-products resulting from the combustion of the particulate metal sulfide additive. Furthermore, the particulate metal sulfide additives generally do not react with $H_2S$ during coal gas desulfurization. Although the CO and/or $H_2$ present in the coal gas may partially reduce the particulate metal sulfide additive producing some $H_2S$ and a mixed stoichiometric sulfide, this reaction is not detrimental to the desulfurization process.

In Table 1 below, the combustion (oxidation) reactions and the heats of reaction and Gibbs free energy are listed for exemplary metal sulfides in their naturally occurring mineral forms, as can be used in the invention.

inlet 28. The fluidizable particles 24 returned to the desulfurization zone 10 typically include, in addition to the regenerated sorbent, at least minor amounts of sulfided sorbent and particulate metal sulfide additive, and particulate metal oxides derived from the particulate metal sulfide additive. The fluidizable particles 24 and, in particular, the regenerated sorbent, are then combined with a sulfur-containing gas in the desulfurization zone 10 as described above. The process is therefore continuous and the active metal oxide sorbent is continually sulfided by absorbing sulfur compounds in the desulfurization zone 10 and regenerated in the regeneration zone 20.

TABLE 1

Naturally-Occurring Metal Sulfide Compounds

| Natural Mineral Ore | Approximate Chemical Formula | Proposed Oxidation Reaction | Thermodynamic Properties at 500° C. (932° F.) | |
|---|---|---|---|---|
| | | | $\Delta H$ (KCal)/mol $O_2$ | $\Delta G$ (KCal)/mol $O_2$ |
| Alabandite | MnS | $MnS + 1.5O_2 = MnO + SO_2$ | −74.80 | −64.70 |
| Bornite | $Cu_5FeS_4$ | $Cu_5FeS_4 + 7O_2 = FeO + 5CuO + 4SO_2$ | −64.41 | −48.99 |
| Braggite | PtS | $PtS + 1.5O_2 = PtO + SO_2$ | −45.28 | −38.22 |
| Chalcopyrite | $CuFeS_2$ | $CuFeS_2 + 3O_2 = CuO + FeO + 2SO_2$ | −66.68 | −57.33 |
| Covellite | CuS | $CuS + 1.5O_2 = CuO + SO_2$ | −63.85 | −53.24 |
| Chalcocite | $Cu_2S$ | $Cu_2S + 2O_2 = 2CuO + SO_2$ | −64.14 | −44.35 |
| Iron pyrite/Marcasite | $FeS_2$ | $FeS_2 + 2.5O_2 = FeO + 2SO_2$ | −66.55 | −65.59 |
| Millerite | NiS | $NiS + 1.5O_2 = NiO + SO_2$ | −72.50 | −62.09 |
| Molybdenite | $MoS_2$ | $MoS_2 + 3.5O_2 = MoO_3 + 2SO_2$ | −72.61 | −61.55 |
| Oldhamite | CaS | $CaS + 1.5O_2 = CaO + SO_2$ | −73.29 | −63.28 |
| Pyrrhotite | FeS | $FeS + 1.5O_2 = FeO + SO_2$ | −75.84 | −66.14 |
| Wurtzite/Sphalerite | ZnS | $ZnS + 1.5O_2 = ZnO + SO_2$ | −71.41 | −61.64 |

The heats of reaction in the above table demonstrate that a highly exothermic reaction results in the combustion of the particulate metal sulfide additives. Furthermore, the Gibbs free energy values for the reaction indicate high combustibility of the particulate metal sulfide additives.

The metal oxide resulting from the oxidation of the particulate metal sulfide additive can be recycled in the process or, as in the case of iron pyrite ($FeS_2$), can form a lightweight solid material such as an ash which is not recycled. As illustrated in FIG. 1, the oxygen-containing gas stream and the fluidizable particles 24 carried by the oxygen-containing gas stream flow from the regeneration zone 20 into a riser tube 39 which further facilitates contact between the fluidizable particles and the oxygen-containing gas stream. The fluidizable particles 24 and oxygen-containing gas stream then advance to a solid-gas separator 40 such as a cyclone separator. From the solid-gas separator 40, the fluidizable particles 24 are recovered and returned to the desulfurization zone 10 via suitable means such as pipe 42 and the oxygen-containing gas stream, which now contains significant amounts of $SO_2$, exits through outlet 44 for further treatment. In the case of iron pyrite, and similar additives, a portion of the metal oxides derived from the particulate metal sulfide additive is not recovered by the solid-gas separator and exits through outlet 44 with the off-gas stream. Loss of these metal oxides particularly occurs when the metal oxides are converted to an ash-like form. Furthermore, a portion of the active metal oxide sorbent is normally lost due to attrition through outlet 44 in the same manner as the metal oxide derived from the particulate metal sulfide additive.

As shown in FIG. 1, a substantial portion of the fluidizable particles 24 including the regenerated active metal oxide sorbent, are recovered from the regeneration zone 20 and returned to the desulfurization zone 10 through pipe 42 and Because a portion of the active metal oxide sorbent is continuously lost from the process due to attrition, additional active metal oxide sorbent is typically continuously added to the desulfurization zone 10 through inlet hopper 26 to maintain enough of the active metal oxide sorbent to sufficiently remove the sulfur compounds from the sulfur-containing gas stream fed into the desulfurization zone. In one preferred embodiment of the invention, the particulate metal sulfide additive is also continuously added to the desulfurization zone 20 together with the fresh sorbent via hopper 26. The particulate metal sulfide additive, when continuously added in this manner, continuously promotes a temperature increase in the regenerator to provide sufficient heat to increase the degree of sorbent regeneration in the regenerator to the desired degree of regeneration, or to provide sufficient heat to provide a self-sustaining regeneration reaction of the desired degree in the regenerator when the temperature conditions in the regenerator would not otherwise support a self-sustaining regeneration of the sorbent to any significant extent.

In some cases it is not necessary to add additional particulate metal sulfide additive following start-up of the process in order to establish regeneration conditions or to increase the degree of regeneration. In such cases the benefit of the particulate metal sulfide additive is realized during startup of the regeneration process. Thus, in the case of some process designs, once the temperature of the regeneration zone 20 is raised to the initiation temperature of the regeneration reaction by the combustion of the particulate metal sulfide additive, the particulate metal sulfide additive is generally no longer needed to increase the temperature of the regeneration zone 20, primarily because the regeneration reaction is exothermic and the regeneration zone 20 is adiabatic.

As indicated previously, the sorbent composition of the invention comprising the particulate metal sulfide additive and the active metal oxide sorbent can be provided in numerous different forms. In any case, the metal sulfide is present in a particulate form that is physically distinct from the active metal oxide used in the sorbent composition. This allows the particulate metal sulfide additive to be used in its naturally-occurring mineral form in the preferred embodiments of the invention, and in any case allows the particulate metal sulfide additive to be present in the form of a sulfide, distinct from the sorbent metal which must be in oxide form to function as a sorbent.

The sorbent composition and particulate metal sulfide additive can be provided in admixture in numerous different forms or arrangements. In one embodiment, the active metal oxide sorbent and particulate metal sulfide additive can be supported together on the same particulate support material. Suitable particulate support materials are generally inert with respect to the desulfurization and regeneration processes and include titania, alumina, silica, kaolin, emathlite, chromia, and mixtures thereof. The active metal oxide sorbent and the particulate metal sulfide can be mixed and applied together to the particulate support material by granulation, spray-drying or other suitable techniques well known to one skilled in the art, or the active metal oxide can be chemically deposited on the support and thereafter the particulate metal sulfide additive can be physically deposited on the support.

In preferred sorbent compositions of the invention, the active metal oxide sorbent and the particulate metal sulfide additive are provided as fluidizable particles. Preferred fluidizable active metal oxide sorbents are disclosed in U.S. Pat. No. 5,254,516 to Gupta et al., in commonly assigned U.S. application Ser. No. 08/325,853 to Gupta et al. filed Oct. 19, 1994 and in commonly assigned U.S. application Ser. No. 08/711,877 to Gupta et al, filed Sep. 12, 1996. These applications and the Gupta et al. patent are incorporated herein by reference in their entirety. In the case of fluidizable sorbents wherein the metal sulfide particles are unsupported, the particulate metal sulfide additive is ground or otherwise sized to a fluidizable size having hydrodynamic properties substantially the same, or generally comparable to the fluidizable sorbent. The hydrodymanic properties depend on particle size, sphericity and particle density, as is well known in the art.

The metal sulfide can alternatively be provided on a particulate support material separate from the active metal oxide sorbent. This is particularly preferred when the regeneration zone is a moving bed reactor. In such case, although the active metal oxide sorbent and the particulate metal sulfide additive are applied on separate particles of the support material, the particulate support material used for both the active metal oxide sorbent and the particulate metal sulfide additive can be identical. Thus, the metal sulfide can be applied to a support as described previously, but it is not mixed with the active metal oxide on the same support material.

In one advantageous embodiment, the particulate metal sulfide additive is provided in the form of fluidizable or non-fluidizable pellets or particles comprising added binder material. These pellets can be formed by any suitable pellet-making techniques known in the art including disk pelletization, extrusion/spheronization, pellet presses, and the like. For example, the metal sulfide particulate matter can be mixed with various organic and/or inorganic binders, and/or other inert materials, the mixture formed into a paste in water or an organic solvent, and the pellets formed by extrusion, spheronization and drying.

Another alternative for preparing the sorbent composition of the invention, is to provide the active metal oxide sorbent on a first particulate support material as described above and to provide the particulate metal sulfide additive as fluidizable particles mixed with the supported active metal oxide sorbent. This particular alternative is preferred with fluidized bed reactors and does not require the additional step of applying the metal sulfide to a support material. The metal sulfide particles are typically spherical and prepared to have the desired morphology, size, shape, density, porosity, surface area, etc., to become fluidized in the desulfurization and regeneration zones, 10 and 20. Preferably, the supported active metal oxide sorbents and the particulate metal sulfide additive are provided and mixed such that the hydrodynamic properties of the sorbent composition are uniform.

As indicated previously, the process of the invention can be conducted without any premixing of the particulate metal sulfide additive and the active metal oxide sorbent. In such instances, the particulate metal sulfide additive can be added directly to the desulfurization zone, or to the sulfided active metal oxide sorbent just prior to, or during, regeneration of the sorbent. As in the above described processes, the sulfided sorbent and the particulate metal sulfide additive are treated with an oxygen-containing gas in the regeneration zone under conditions sufficient to initiate reaction of the particulate metal sulfide additive with oxygen and to increase the temperature of the regeneration zone to a temperature sufficient for initiation of the regeneration reaction of sulfided sorbent with oxygen.

In many cases, it is highly desirable to add additional fresh make-up metal sulfide additive continuously or intermittently to the desulfurization/regeneration reaction system in order to replenish additive that is continuously lost from the system. Regeneration of the particulate metal sulfide additive, particularly when present in its preferred embodiment as a naturally-occurring mineral, will generally provide a highly attrition-prone ash-like material. In such cases the ability of metal sulfide additive to produce the desired temperature rise during regeneration decreases with each subsequent desulfurization and regeneration cycle since the ash-like material is not recycled to the desulfurizer. When the metal sulfide additive experiences high attrition, more active metal oxide material can be added to the desulfurization/regeneration reaction on a continuous basis. Alternatively, fresh metal sulfide additive can be added to provide any necessary temperature rise as fresh metal sulfide additive, particularly in its naturally-occurring mineral form, is quite inexpensive and can be fed along with the active metal oxide sorbent.

The invention will now be further described by the following non-limiting examples. In these examples, a 2.5-kg batch of iron pyrite (CAS # 12068-85-8) having a particle size range of 85 percent below 50 mesh was purchased from E. M. Science Company and used as the particulate metal sulfide additive. Tests were conducted using CMP-107 sorbent, a zinc titanate sorbent, the preparation of which is described in U.S. patent application Ser. No. 08/711,877, filed Sep. 12, 1996 by Raghubir Gupta for transport reactor applications, with and without the iron pyrite. These tests were conducted in the high-temperature, high-pressure (HTHP) bench-scale sorbent test facility described in Gupta, R. P. and Gangwal S. K., *Enhanced Durability of Desulfurization Sorbents for Fluidized-Bed Applications*, NTIS Report No. DOE/MC/25006-3271 (DE93000247), November, 1992, which is incorporated in its entirety herein by reference.

The following examples describe regeneration processes using mixed sorbent materials as described above. In the following examples, it was generally found that following the introduction of an $O_2$-containing gas stream into the reactor at 900° F., $SO_2$ concentration in the reactor effluent would begin to rise rapidly. After a certain lag time associated with placement of the thermocouple, the temperature would also begin to rise rapidly. With the correct combination of $O_2$ in the feed and additive content in the sorbent bed, the temperature increase would be sufficient to initiate regeneration of the mixed-active metal oxide sorbent. Temperature increases of 200° F. to 500° F. were observed, although some of this temperature increase was a result of the regeneration of the sulfided mixed-active metal oxide sorbent.

EXAMPLE 1
(COMPARATIVE)

A 200 g sample of zinc titanate sorbent labeled CMP-107 with particles between 20 and 150 μm was loaded in the HTHP reactor. No particulate metal sulfide additive was added with the sorbent material. At 280 psig and 900° F., the CMP-107 material was sulfided in a 2-in I.D. reactor with 12.7 standard liters per minute (SLPM) of simulated Texaco coal gas. The composition of the simulated Texaco coal gas was 2 vol % $H_2S$, 30 vol % CO, 10 vol % $CO_2$, 20 vol % $H_2$, 18 vol % $N_2$, and 20 vol % steam. The exposure of the simulated coal gas continued until the $H_2S$ concentration in the reactor effluent exceeded 1000 ppmv. After a 30 minute nitrogen purge to remove all traces of coal gas, the pressure was reduced to 100 psig. Regeneration of the sulfided sample was attempted at 900° F. with 4 SLPM of air. After the oxygen concentration in the effluent became essentially the same as the feed, the regeneration temperature was increased approximately 20° F. At 920° F., no significant regeneration was observed. The regeneration temperature was repeatedly increased by about 20° F. until regeneration initiation was observed. At 1140° F., initiation of the regeneration reaction was observed with the associated rapid rise in $SO_2$ concentration and temperature increase associated with the exothermic oxidation of the sulfided sorbent. The maximum temperature observed during regeneration was 1370° F. The $SO_2$ concentration peaked at 10.5 vol %. Regeneration lasted for 130 minutes. However, the $SO_2$ concentration was below 2000 ppmv after 102 minutes.

EXAMPLE 2
(INVENTION)

A 200 g sample of CMP-107 containing particles of between 20 and 150 μm was mixed with 10 g of iron pyrite (5 wt. %) having particles between 53 and 75 μm. This mixture was loaded in the HTHP reactor system. At 900° F. at 280 psig, this mixture was sulfided with 12.7 SLPM of simulated Texaco coal gas. The simulated Texaco coal gas contained 2 vol % $H_2S$, 30 vol % CO, 10 vol % $CO_2$, 20 vol % $H_2$, 18 vol % $N_2$ and 20 vol % steam. Exposure to simulated coal gas with $H_2S$ continued until the $H_2S$ concentration in the reactor effluent exceeded 1000 ppmv. After a 30 minute nitrogen purge to remove all traces of coal gas, the pressure was reduced to 100 psig. Regeneration of the sorbent mixture was started at 940° F. in 4 SLPM of neat air. The $SO_2$ concentration and temperature began to rapidly increase. The $SO_2$ concentration increased to about 8 vol %. The maximum observed temperature was 1500° F. Regeneration lasted for 32 minutes with the $SO_2$ concentration exceeding 2000 ppmv for 30 minutes.

EXAMPLE 3
(INVENTION)

This example demonstrates the impact of iron pyrite additive over three cycles of use.

Another 200 g of CMP-107 with particles between 20 and 150 μm and 10 g of iron pyrite with particles between 53 and 75 μm were mixed and loaded into the HTHP reactor system. This mixture was sulfided at 900° F. and 280 psig with simulated Texaco coal gas. The simulated Texaco coal gas contained 2 vol % $H_2S$, 30 vol % CO, 10 vol % $CO_2$, 20 vol % $H_2$, 18 vol % $N_2$ and 20 vol % steam. Exposure to simulated coal gas with $H_2S$ continued until the $H_2S$ concentration in the reactor effluent exceeded 1000 ppmv. After a 30 minute nitrogen purge to remove all traces of coal gas, the pressure was reduced to 100 psig. Regeneration of the sorbent mixture was started at 920° F. in 4 SLPM of neat air. The temperature and $SO_2$ began to rapidly increase after the introduction of air. The maximum temperature observed during regeneration was 1370° F. The maximum $SO_2$ concentration was about 8 vol %. The regeneration lasted for 80 minutes with the $SO_2$ concentration exceeding 2000 ppmv for 60 minutes.

After this regeneration, the reactor was purged with nitrogen and pressure increased to 280 psig. The mixture was sulfided a second time using the same simulated Texaco coal gas with 2 vol % $H_2S$ at 12.7 SLPM. After the $H_2S$ concentration in the reactor effluent reached 1000 ppmv the sulfidation was terminated. The reactor system was purged for 30 minutes before reducing the pressure to 100 psig. Regeneration was started at 920° F. by introducing 4 SLPM of neat air. Sorbent temperature and $SO_2$ rapidly increased. The sorbent bed reached a maximum temperature of 1370° F. The $SO_2$ concentration peaked at 8.5 vol %. The regeneration lasted for 70 minutes with the $SO_2$ concentration exceeding 2000 ppmv for 55 minutes.

After a 30 minute purge in nitrogen, a third sulfidation of this material was performed at exactly the same conditions as used in the previous cycle. After a 30 minute nitrogen purge, a third regeneration was performed at 920° F. with 4 SLPM of neat air at 100 psig. The maximum sorbent temperature during this third regeneration was 1230° F. The $SO_2$ concentration peaked at 7.4 vol %. Total run time for the regeneration was 110 minutes with the $SO_2$ concentration being above 2000 ppmv for about 75 minutes.

EXAMPLE 4
(INVENTION)

This example demonstrates the applicability of metal sulfide additive with a spray dried zinc titanate sorbent (having different chemical composition than CMP-107) developed by a different vendor using different set of binders and support materials.

A 200 g sample of an attrition-resistant zinc titanate sorbent labeled EX-S03 with particles between 50 and 150 μm was physically mixed with 10 g of iron pyrite with particles between 53 and 75 μm. This mixture was loaded in the HTHP reactor system. At 1000° F. and 262 psig, the mixture was sulfided with 30 SLPM of simulated coal gas containing 15 vol % $H_2$, 25 vol % CO, 5 vol % $CO_2$, 5 vol % $H_2O$, 1.4 vol % $CH_4$, 48.4 vol % $N_2$, and 0.2 vol % $H_2S$. Exposure to simulated coal gas with $H_2S$ continued until the $H_2S$ concentration in the reactor effluent exceeded 1000 ppmv. After a 30 minute nitrogen purge to remove all traces of coal gas, regeneration of the sorbent was started by heating the sorbent to 1040° F. at 262 psig with 10 SLPM of neat air. The temperature of the reaction and the $SO_2$ concentration in the off gases were monitored throughout regeneration. It was found that initially, both the $SO_2$ concentration, and temperature, increased rapidly and then stabilized. The maximum $SO_2$ concentration measured during regeneration was 15 vol %, whereas the maximum observed temperature was 1450° F. Regeneration lasted for 40 minutes.

The above sulfidation-regeneration sequence was continued for 10-cycles. No additional iron pyrite particles were added during this period. During the first four cycles, the iron pyrite particles provided enough temperature rise during regeneration to allow initiation of the regeneration of sulfided zinc titanate at 1040° F. During Cycles 5 to 10, regenerations had to be started by heating to the higher temperature of 1110° F., indicating that pyrites were transformed into other chemical forms.

EXAMPLE 5
(INVENTION)

This example demonstrates the applicability of the iron pyrite additive in a pilot-scale hot-gas desulfurization system.

Approximately 15 lbs of the same sorbent used in Example 4 (EX-S03) containing particles between 50 and 150 μm, and 1.5 lb of iron pyrite particles ranging in size from 0 to 40 μm were loaded in M. W. Kellogg's Transport Reactor Test Facility (TRTU). This pilot-scale test facility had a riser section that was about 40-ft. tall and was operated at velocities in 10 to 20 ft/s. This facility is a prototype of a commercial system shown in FIG. 1.

Using a gas velocity of 10 to 20 ft/s and a very dilute gas-solid suspension of a density in the range of 1 to 3 lbs per cu.ft., this sorbent reduced the $H_2S$ level of coal gas from 12,000 ppmv to less than 1000 ppmv within a residence time of about 3 sec at a temperature in the range of 1000 to 1,200° F. and 100 psi pressure. The sulfided sorbent was regenerated with neat air in this transport reactor system. The regeneration was successfully carried out at 1020° F. with about 200° F. temperature rise provided by iron pyrites (see Example 6, below).

EXAMPLE 6
(COMPARATIVE)

The EX-S03 sorbent was tested in TRTU exactly in the same manner as Example 5, except for that no iron pyrite particles were added. The minimum temperature at which the sorbent supported a self-sustaining regeneration was 1200° F. At lower temperatures, an instant oxygen breakthrough was observed indicating a lack of regeneration.

EXAMPLE 7
(INVENTION)

This example describes the preparation of the metal sulfide additives of the invention in the form of 4 mm iron pyrite pellets without any support and with titania, alumina and emathlite as support materials.

All materials described in this example were prepared by the following procedure. The dry material was charged into a conventional kneader device and the motor started. Dry mixing was conducted for 2 to 5 minutes. After dry mixing, liquid carboxymethylcellulose binder was slowly charged into the moving dry powder. Movement of the two "S" shaped kneading arms caused intimate mixing of the charged materials. When the mixing sample was homogeneous, it was dumped into trays and loaded onto the feed pan of an extruding apparatus (EXDFS-100-XTRUDER®). Twin auger blades transported the wet powder from the feed hopper onto the extrusion blades. The extrusion blades wiped material through the die plate, forming cylindrical extrudates. A measured amount of the extruded material was loaded a commercially available pelletizing device, (MARUMERIZER QJ-400) in which the extruded particles were broken and rounded by impact forces. When the material reached the desired shape, a discharge port was opened allowing the spheres into a container. All samples were placed in an oven and dried at 120° C. for a minimum of 2 hr.

The relative compositions and crush strength data for the different type of pellets made is provided in the following table.

| Sample Label | A | B | C | D | E | F | G |
|---|---|---|---|---|---|---|---|
| Material (wt %) | | | | | | | |
| Emathlite | 80 | 20 | | | | | |
| Titania | | | 20 | 80 | | | |
| Alumina | | | | | 20 | 80 | |
| Pyrite | 20 | 80 | 80 | 20 | 80 | 20 | >90 |
| Binder | $M^1$ | $M^1$ | $M^1$ | $M^1$ | $M^1$ | $M^1$ | $M^1$ |
| Crush Strength ($lb_f$/pellet) | 7.66 | 12.71 | 11.81 | 6.61 | 9.87 | 12.10 | 8.27 |

$M^1$ refers to Methocel.

EXAMPLE 8
(INVENTION)

This example demonstrates the stability of the pellets produced in Example 7 throughout several sulfidation and regeneration cycles. A 400 g batch of 4 mm diameter pellets of Sample A, prepared as described in Example 7, was loaded in the HTHP reactor system. After heating the reactor to 750° F. in nitrogen, the sample was exposed to 12 SLPM of 5 vol % $O_2$ in nitrogen at 88 psig. Both the temperature of the additive bed and the $SO_2$ in the reactor effluent increased rapidly. The maximum $SO_2$ concentration observed was 2.5 vol %, whereas the maximum temperature in the additive bed was 1030° F.

After regeneration, the reactor spurged withpurged with nitrogen for 30 minutes and the pressure increased to 280 psig. The additive was sulfided with a simulated Texaco coal gas containing 2 vol % $H_2S$, 30 vol % CO, 10 vol % $CO_2$, 20 vol % $H_2$, 18 vol % $N_2$ and 18 vol %. steam and a flowrate of 12 SLPM. Exposure to simulated coal gas with $H_2S$ continued until the $H_2S$ concentration in the reactor effluent exceeded 1000 ppmv. The reactor system was purged with nitrogen for 30 minutes before reducing the pressure to 88 psig. The second regeneration was started at 900° F. with 12 SLPM of 5 vol % $O_2$ in nitrogen. The $SO_2$ concentration and temperature both began to rise. The reactor effluent $SO_2$ concentration reached its maximum value at 2.1 vol %. The maximum temperature observed was 1010° F.

EXAMPLE 9
(COMPARATIVE)

A 400 g sample of 4 mm diameter zinc titanate sorbent pellets was loaded in the HTHP reactor system. This sample was sulfided at 900° F., 280 psig and 9.6 SLPM of simulated Texaco coal gas containing 2 vol % $H_2S$, 30 vol % CO, 10 vol % $CO_2$, 20 vol % $H_2$, 18 vol % $N_2$ and 18 vol % steam. Exposure to simulated coal gas containing $H_2S$ was continued for 125 minutes. The reactor was purged with nitrogen for 30 minutes before reducing the pressure to 88 psig. Regeneration was started at 1000° F. and 4.8 SLPM of 7 vol % $O_2$ in nitrogen. The temperature in the sorbent bed increased to a maximum temperature of 1035° F. The maximum reactor effluent $SO_2$ concentration was 3.4 vol %.

EXAMPLE 10
(INVENTION)

This example demonstrates the use of the additive materials prepared in Example 7 to enhance the regeneration process of Example 9. A 268 g sample of a 4 mm diameter pre-sulfided zinc titanate sorbent pellets was mixed with 26 g (10 wt %) of Sample F pellets prepared as described in Example 7. This mixture was loaded in the HTHP reactor system. After heating the reactor to 900° F. and increasing the pressure to 88 psig, the mixture was exposed to 2.8 SLPM of 5 vol % $O_2$ in nitrogen. These conditions were sufficient to initiate a self-sustaining regeneration. The maximum temperature recorded in the sorbent bed was 1010° F. The maximum $SO_2$ concentration in the reactor effluent was 2.0 vol %.

Accordingly it can be seen that the invention provides an inexpensive alternative to conventional methods of regenerating sulfided sorbents used in the removal of sulfur compounds. The method of the invention uses the combustion of a metal sulfide compound to increase the temperature in a regeneration zone to above the initiation temperature of the regeneration reaction of the sulfided sorbent. The metal sulfide may be in the form of an inexpensive mineral ore and thus there is little expense associated with increasing the temperature in the regeneration zone. Furthermore, the metal sulfide is preferably inert with respect to the contents of the sulfur-containing gas stream and readily oxidizes to form an active metal oxide which may be recycled in the process or lost due to attrition.

The invention has been described in considerable detail with reference to its preferred embodiments. However, as indicated previously, these methods and compositions of matter described herein are susceptible to numerous alternatives and variations without departure from the spirit and scope of the invention as described in detail in the foregoing specification and defined in the appended claims.

That which is claimed is:

1. A process of regenerating an active metal oxide sorbent used for removing at least one sulfur compound from a sulfur-containing feed stream comprising the steps of:
   recovering a sulfided active metal oxide sorbent from a desulfurization zone; and
   treating the sulfided sorbent with an oxygen-containing gas stream in a regeneration zone in the presence of a particulate metal sulfide additive under conditions sufficient to provide an exothermic reaction between oxygen and the particulate metal sulfide additive to thereby raise the temperature of the regeneration zone by at least 50° F. and initiate regeneration of the sulfided sorbent.

2. The process according to claim 1 further comprising the step prior to said recovering step, of;
   contacting a sulfur-containing feed stream with an admixture of active metal oxide sorbent and the particulate metal sulfide additive in said desulfurization zone at a temperature sufficient to allow the active metal oxide sorbent to react with at least one sulfur compound from the sulfur-containing feed stream to form sulfided sorbent.

3. The process according to claim 1 wherein said particulate metal sulfide additive comprises a mineral ore selected from the group consisting of iron pyrite, alabandite, bornite, braggite, chalcopyrite, covellite, chalcocite, marcasite, millerite, molybdenite, oldhamite, pyrrhotites, wurtzite/sphalerite, digenite, cubanite, argentite/acanthite, and pentlandite, and mixtures thereof.

4. The process according to claim 3 wherein said particulate metal sulfide additive comprises iron pyrite.

5. The process according to claim 1 further comprising the steps, following the step of treating the sulfided sorbent in the regeneration zone;
   recovering the active metal oxide sorbent from the regeneration zone; and
   combining the active metal oxide sorbent with a sulfur-containing gas in the desulfurization zone at a temperature sufficient to allow the active metal oxide sorbent to absorb at least one sulfur compound from the sulfur-containing gas.

6. The process according to claim 5 further comprising the step of adding fresh particulate metal sulfide additive to said active metal oxide sorbent.

7. The process according to claim 2 wherein said contacting step occurs at a temperature of between about 650° F. and 1000° F.

8. The process according to claim 1 wherein said oxygen-containing gas in said treating step includes an oxygen-containing gas selected from the group consisting of dilute, neat, or oxygen enriched air.

9. The process according to claim 2 wherein the particulate metal sulfide additive in said contacting step is present in an amount less than about 20 percent by weight, based on the combined weight of said sorbent and said additive.

10. The process according to claim 2 wherein the active metal oxide sorbent and the particulate metal sulfide additive of said contacting step are supported on a particulate support material.

11. The process according to claim 2 wherein the active metal oxide sorbent of said contacting step is supported on fluidizable support material and mixed with fluidizable particles of the particulate metal sulfide additive, and wherein the regeneration zone is defined by a transport bed reactor.

12. The process according to claim 2 wherein the regeneration zone is defined by a fluidized bed.

13. The process according to claim 2 wherein said active metal oxide sorbent comprises an active metal oxide selected from the group consisting of zinc oxide, zinc titanate, zinc aluminate, zinc silicate, zinc ferrite, iron oxide, nickel oxide, manganese oxide, cerium oxide, copper oxide, copper cerium oxide, copper titanate, vanadium oxide, cobalt oxide, tungsten oxide, calcium oxide, calcium carbonate, magnesium oxide, magnesium carbonate, and mixtures thereof.

14. The process according to claim 2 wherein the sulfur-containing feed stream is a fuel gas and said at least one sulfur compound is selected from the group consisting of $H_2S$, COS, and $CS_2$.

15. The process according to claim 2 wherein said active metal oxide sorbent comprises at least one additive selected from the group consisting of promoters and stabilizers.

16. A process of initiating the regeneration of a sulfided sorbent derived from an active metal oxide sorbent comprising treating said sulfided sorbent with an oxygen-containing gas in a regeneration zone, in the presence of a particulate metal sulfide additive, at a temperature sufficient to exothermically react the particulate metal sulfide additive with oxygen, to thereby increase the temperature of the regeneration zone to a temperature which initiates the reaction of the sulfided sorbent with oxygen.

17. The process according to claim 16 wherein the particulate metal sulfide additive comprises a mineral ore selected from the group consisting of iron pyrite, alabandite, bornite, braggite, chalcopyrite, covellite, chalcocite, marcasite, millerite, molybdenite, oldhamite, pyrrhotites, wurtzite/sphalerite, digenite, cubanite, argentite/acanthite, and pentlandite, and mixtures thereof.

18. The process according to claim 17 wherein the mineral ore is iron pyrite.

* * * * *